(12) United States Patent
Schofield et al.

(10) Patent No.: US 8,961,325 B2
(45) Date of Patent: Feb. 24, 2015

(54) ROTOR HUB ELASTOMERIC BEARINGS (71) Applicant: Bell Helicopter Textron Inc., Fort Worth, TX (US)

(72) Inventors: Emily Schofield, Colleyville, TX (US); Chad Jarrett, Arlington, TX (US); Dan Sottiaux, Flower Mound, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/800,440

(22) Filed: Mar. 13, 2013

(65) Prior Publication Data
US 2014/0270610 A1 Sep. 18, 2014

(51) Int. Cl.
F16D 3/70 (2006.01)
F16C 27/06 (2006.01)

(52) U.S. Cl.
CPC .................................. F16C 27/063 (2013.01)
USPC .................................. 464/69; 29/434; 464/70

(58) Field of Classification Search
CPC ............... F16D 3/62; F16D 3/68; F16D 3/70; B64C 27/12
USPC ........ 464/69–72, 89–91; 244/60; 29/434, 436
See application file for complete search history.

(56) References Cited

U.S. PATENT DOCUMENTS

| 4,588,388 A | * | 5/1986 | Chivari .................. 464/71 X |
| 4,729,753 A | | 3/1988 | Neathery et al. |
| 4,804,352 A | | 2/1989 | Schmidt |
| 5,186,686 A | | 2/1993 | Staples et al. |

FOREIGN PATENT DOCUMENTS

| GB | 660560 | * 11/1951 | ................ 464/71 |
| SU | 615289 | * 7/1978 | ................ 464/72 |

* cited by examiner

Primary Examiner — Gregory Binda
(74) Attorney, Agent, or Firm — Fish & Richardson P.C.

(57) ABSTRACT

An apparatus comprising a drivelink comprising a housing including a socket, wherein the socket comprises a cross-sectional area, and a bearing cartridge disposed within the socket, wherein a cross-sectional area of the cartridge is less than the cross-sectional area of the socket. An apparatus comprising a drivelink comprising a housing having a socket, and a bearing cartridge positioned within the socket and comprising a first portion and a second portion, wherein the first portion is configured to undergo compression when a load is applied to the drivelink, and wherein the second portion is configured to not be in tension when the load is applied to the drivelink.

18 Claims, 8 Drawing Sheets

ROTOR HUB ELASTOMERIC BEARINGS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The disclosure pertains to helicopter rotors and to drivelinks for incorporation within helicopter rotors. Rotor systems may incorporate drivelinks for transferring torque between a drive shaft and driven shafts that rotate about misaligned axes. For example, a multilink joint comprising a plurality of drivelinks may be incorporated in a helicopter rotor assembly in order to reduce and/or normalize kinematic errors introduced during operation of the rotor assembly (e.g., oscillatory strain, lateral wobbling, etc.). Examples of such are found in U.S. Pat. No. 5,186,686 and U.S. Pat. No. 4,729,753, both of which are incorporated herein by reference. Such multilink joint may comprise a wobble plate and a plurality of drivelinks coupling drive link trunnions to the wobble plate.

The drivelinks may comprise elastomeric bearings in order to enable movement of the wobble plate within a predetermined, limited range of motion. However, problems arise when constructing an elastomeric bearing that is resilient enough to reduce and/or normalize kinematic error, and which is also strong enough to carry the operational loads. More particularly, problems arise because as elastomeric material is made stronger, its resiliency decreases. As a result, in previous systems comprising drivelinks as the elastomeric bearings are compressed so as to transfer torque loads, the backside of the bearings experience harmful tension (e.g., one side of the bearing is put in compression and the other side of the bearing is put in tension). The tension can pull apart the elastomeric material or the layers of elastomeric material and metal within the bearings, which degrades bearing performance. Therefore, needed is driveshaft comprising an elastomeric bearing that offers effective kinematic performance without experiencing tension.

SUMMARY

In an embodiment, an apparatus is provided. The apparatus comprises a drivelink comprising a housing including a socket, wherein the socket comprises a cross-sectional area, and a bearing cartridge disposed within the socket, wherein a cross-sectional area of the cartridge is less than the cross-sectional area of the socket.

In an embodiment, an apparatus is provided. The apparatus comprises a drivelink comprising a housing having a socket, and a bearing cartridge positioned within the socket and comprising a first portion and a second portion, wherein the first portion is configured to undergo compression when a load is applied to the drivelink, and wherein the second portion is configured to not be in tension when the load is applied to the drivelink.

In an embodiment, disclosed is a method comprising providing a drivelink comprising a housing having a socket, and a bearing cartridge positioned within the socket and comprising a first portion and a second portion, wherein the first portion is configured to undergo compression when a load is applied to the drivelink, and wherein the second portion is configured to not be in tension when the load is applied to the drivelink.

BRIEF DESCRIPTION OF THE DRAWINGS

For a detailed description of the disclosed embodiments, reference will now be made to the accompanying drawings in which.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein is a drivelink comprising sockets and elastomeric bearings disposed within the sockets. The elastomeric bearings may be configured such that they offer effective strength and compression properties without experiencing tension. In doing so, the elastomeric bearings may be pre-loaded so that the cross-sectional area of each bearing is less than the cross-sectional area of a socket in which it is placed. The amount of pre-loading may be substantially equal to the amount of deformation expected to be experienced by the elastomeric bearing upon compression thereof. Thus, prior to operation a spacing may be located within the socket and proximate the elastomeric bearing. In operation as the elastomeric bearing is compressed, the elastomeric bearing may deform so as to occupy the location of the spacing. Because the elastomeric bearing may deform into the location of the spacing, compression of the front side of the elastomeric bearing does not exert tension on the back side of the elastomeric bearing. Therefore, the disclosed drivelink offers superior strength and compression capabilities and has a prolonged lifespan.

Figure 1:
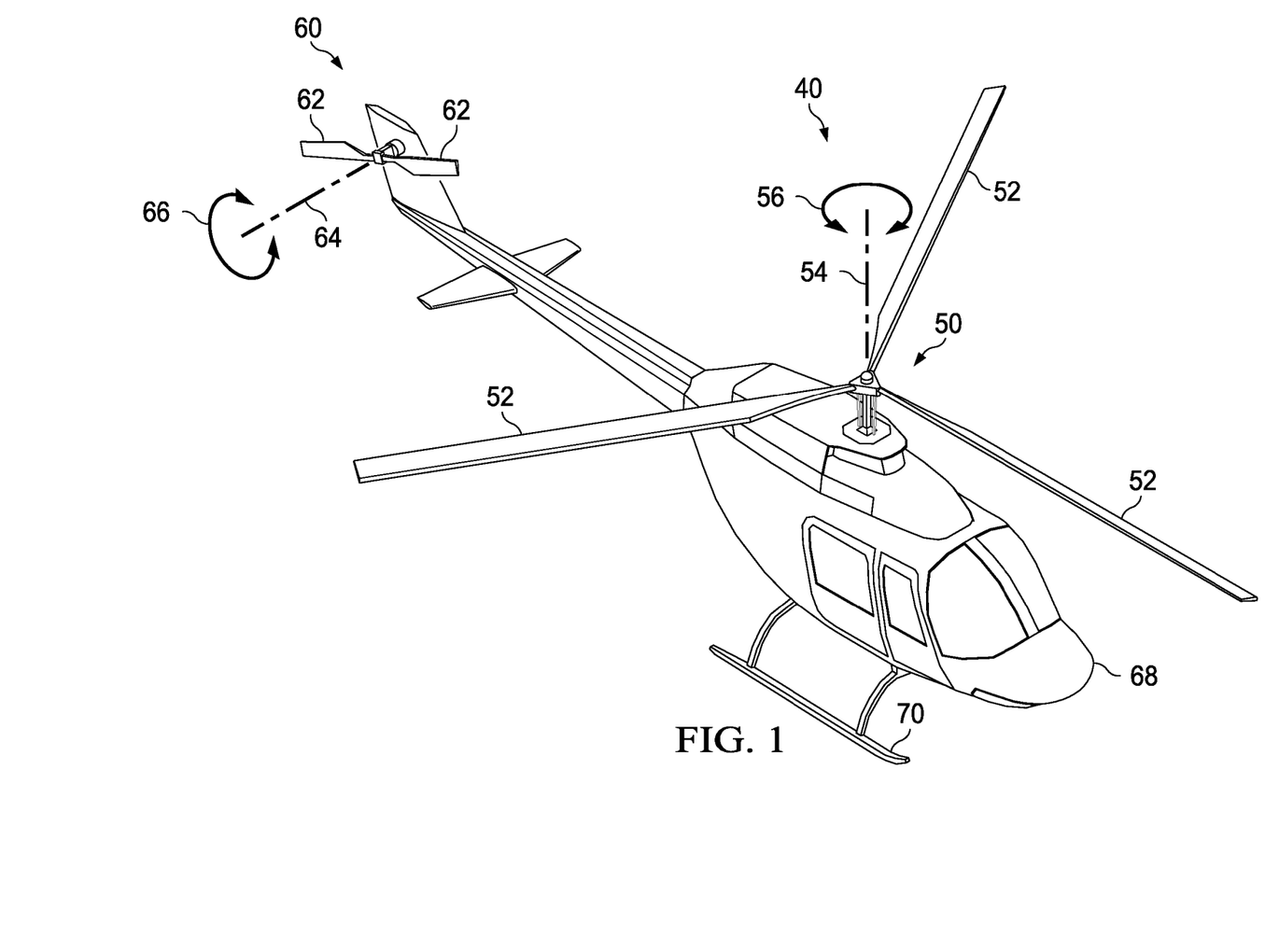
FIG. 1 is a perspective view of an embodiment of a helicopter having a drivelink.

FIG. 1 is a perspective view of a helicopter 40. Certain embodiments of the disclosure may be used with a helicopter such as helicopter 40. However, it should be understood that the helicopter example is given merely for illustration purposes only. Embodiments of the present disclosure are not limited to any particular setting or application, and embodiments can be used with a drive system in any setting or application such as other aircrafts (e.g., airplanes, tiltrotors, etc.), vehicles, or equipment.

In an embodiment, the helicopter 40 includes a main rotor assembly 50, a tail rotor assembly 60, a fuselage 68, and landing gear 70. The main rotor assembly 50 includes two or more blades 52 that are rotated about an axis of rotation 54 in either a clockwise direction or a counterclockwise direction as indicated by arrow 56. The main rotor assembly 50 generates a lift force that supports the weight of helicopter 40 and a thrust force that counter acts aerodynamic drag. Additionally, the main rotor assembly 50 can also be used to induce pitch and roll of the helicopter 40. The tail rotor assembly 60 includes two or more blades 62 that are rotated about an axis of rotation 64 in either a clockwise direction or a counterclockwise direction as indicated by the arrow 66. The tail rotor assembly 60 counters the torque effect created by the main rotor assembly 50 and allows a pilot to control the yaw of the helicopter 40. The fuselage 68 is the main body section the helicopter 40. Optionally, the fuselage 68 holds the crew, passengers, and/or cargo and houses the engine, transmission, gearboxes, drive shafts, control systems, etc. that are needed to establish an operable helicopter. The landing gear 70 is attached to the fuselage 68, supports the helicopter 40 on the ground, and allows it to take off and land.

Figure 2:
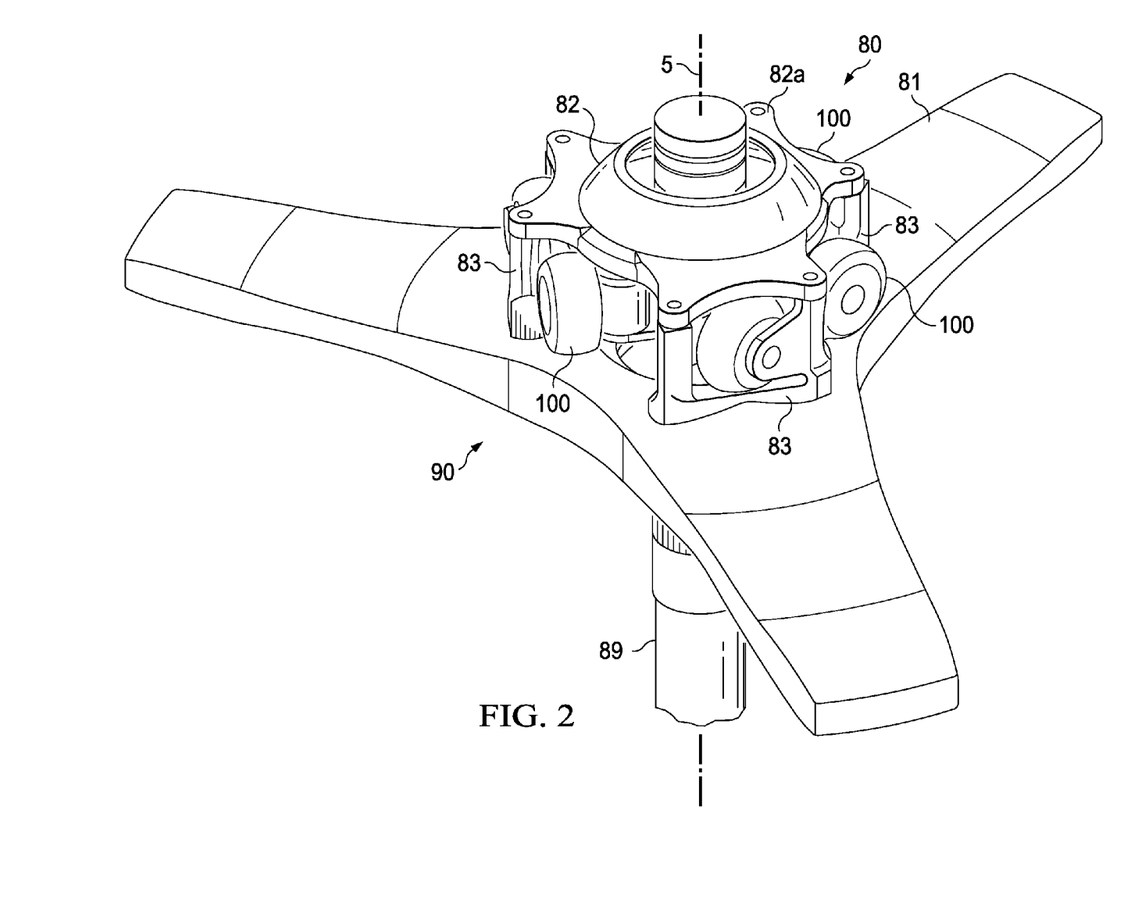
FIG. 2 is a perspective view of an embodiment of a rotor hub system.

In FIG. 2, a rotor hub system 90 is illustrated. In such an embodiment, the rotor hub system 90 may generally comprise a mast 89, a plurality of drivelinks 100, a hub assembly 82, and a yoke 81. In an embodiment, the rotor hub system 90 is configured to rotate about the mast 89. In an embodiment, the mast 89 may be configured to transfer a rotational force and/or torque (e.g., from a transmission, a drive system, etc.) to the rotor hub system 90. In an embodiment, the mast 89 may generally comprise one or more interfacing surfaces (e.g., splines, grooves, etc.) and may extend along a longitudinal axis 5. In an embodiment, the diameter of the mast 89 may be sized for an application (e.g., an aircraft) as would be appreciated by one of ordinary skill in the art upon viewing this disclosure.

Figure 3:
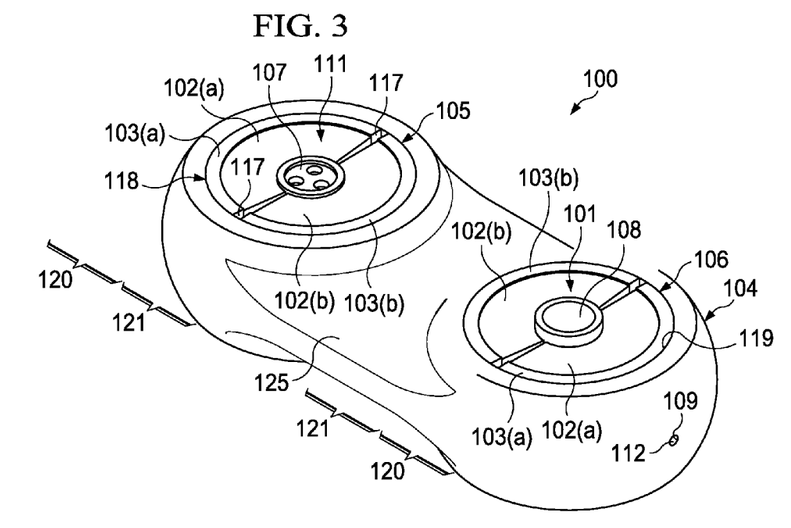
FIG. 3 is a perspective view of a drivelink according to an embodiment.
Figure 4:
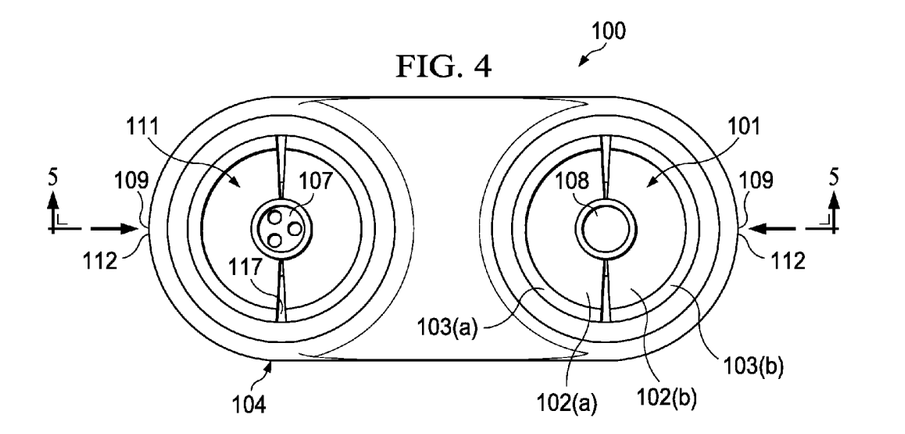
FIG. 4 is a top view of the drivelink as shown in FIG. 3.
Figure 5:
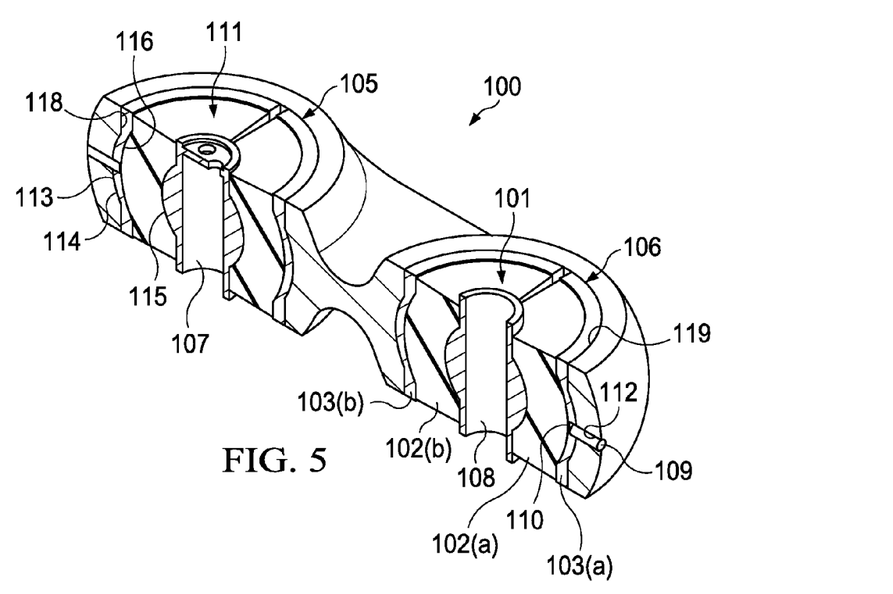
FIG. 5 is a cross-sectional view of the drivelink taken along line 5-5 in FIG. 4.
Figure 6:
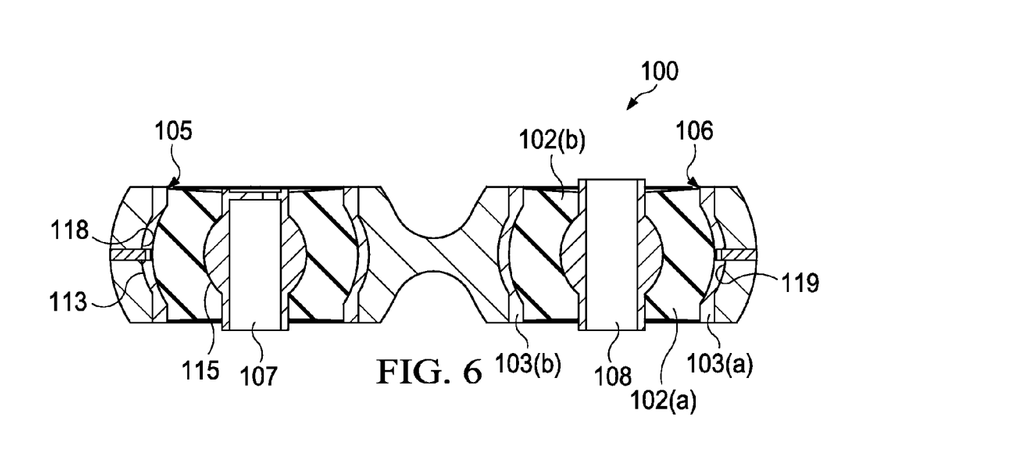
FIG. 6 is a perspective of the cross-sectional view from FIG. 5.

FIGS. 3-6 illustrate a drivelink 100 according to an embodiment. The drivelink 100 may comprise a housing 104, a first bearing cartridge 101, and a second bearing cartridge 111. The housing 104 may comprise a first socket 105 and a second socket 106. The housing 104 may be configured in a dog bone shape when viewed from the side (best seen in FIGS. 3, 5, and 6), wherein the two sockets 105, 106 are coupled via a center portion 125 of the housing 104 that is not as thick as the two sockets 105, 106. The first socket 105 may comprise a generally cylindrical cavity located at a distal end of the housing 104, while the second socket 106 may comprise another generally cylindrical cavity located at a proximate end of the housing 104. As seen in FIGS. 5, and 6, the sockets 105, 106 may be wider at a center portion within the housing 104 than they are at the top and bottom surface of the housing 104 (the arcuate shape discussed below), although such a feature is not required. The housing 104 may comprise a metallic material, such as steel or titanium, or any other suitable material.

The first socket 105 may be configured to support the first bearing cartridge 101, and the second socket 106 may be configured to support the second bearing cartridge 111. Each bearing cartridge 101, 111 may comprise an outer component 120 comprising an outer elastomeric member 102(a) and an outer race 103(a), and an inner component 121 comprising an inner elastomeric member 102(b) and an inner race 103(b). The elastomeric materials 102(a), 102(b) may be any suitable elastomeric material, such as rubber, vulcanized rubber, or alternating layers of rubber and metal. Each bearing cartridge 101, 111 may have a trunnion race 107, 108, respectively, positioned between the outer component 120 and the inner component 121. The first trunnion race 107 may comprise three apertures for supporting a clocking bearing, while the second trunnion race 108 may comprise a single aperture for supporting a rotating bearing. The races 103(a), 103(b) and trunnion races 107, 108 may comprise any suitable material, including a metallic material such as titanium or steel.

The dimensions of the cartridges 101, 111 relative to the housing sockets 105, 106 may be of particular significance and will now be described. FIGS. 3 and 4 illustrate the drivelink 100 in an uncompressed state. In this uncompressed state, the cross-sectional area (when viewed from above as in the FIG. 4 illustration) of the first socket 105 is greater than the cross-sectional area of the first bearing cartridge 101, and the cross-sectional area (when viewed from above as in the FIG. 4 illustration) of the second socket 106 is greater than the cross-sectional area of the second bearing cartridge 111. As a result, a spacing 117 is located within each socket 105, 106. For example, in the embodiment shown in FIGS. 3 and 4, two spacings 117 are located within the first socket 105 between the outer component 120 and the inner component 121, and two spacings 117 are located within the second socket 106 between the outer component 120 and the inner component 121.

The elastomeric members 102(a), 102(b) may each deform a substantially predetermined amount in response to compression forces exerted thereon. The elastomeric members 102(a), 102(b) may be engineered so that when they experience compression forces from the drive, the elastomer members 102(a), 102(b) deform to possess an area substantially equal to the area within the socket 105, 106. Thus, the cartridges may be pre-loaded so that the pre-compression is substantially equal to the expected deformation. For example, when the first bearing cartridge 101 is compressed, the first bearing cartridge 101 may deform to fill the first socket 105 and thereby occupy the area where the spacings 117 were located prior to the compression. Likewise, when the second bearing cartridge 111 is compressed, the second bearing cartridge 111 may deform to fill the second socket 106 and thereby occupy the area where the spacings 117 were located prior to the compression. While the compression of the drivelink 100 is described herein, it will be appreciated that a similar effect will occur when the drivelink is placed in tension.

In some embodiments, the spacings 117 may be located along an axis perpendicular to loads exerted on the drivelink 100. For example, FIG. 4 includes two arrows that may represent the directions of a substantial amount of the load exerted on the drivelink 100. As a result, the arrows may represent the directions of a substantial amount of compression experienced by the cartridges 101, 111. Therefore, as the cartridges 101, 111 are compressed, they may deform into the spacings 117 and thereby take on a shape that is substantially identical to the area within the sockets 105, 106.

However, the spacings 117 need not be aligned perpendicularly to the exerted loads and may be located anywhere within the sockets 105, 106. Moreover, in some embodiments each cartridge 101, 111 may comprise only one spacing 117 instead of two spacings 117. In some embodiments, one of the two cartridges 101, 111 comprises one spacing 117 while the other of the two cartridges 101, 111 comprises more than one spacing 117.

Other alternative embodiments are also included herein. Although the embodiment depicted in FIGS. 3 and 4 comprises components 120, 121 of substantially equal size, in other embodiments the outer component 120 may comprise a first size while the inner component 121 comprises a second size. In some embodiments, the outer component 120 may comprise a first resilience while the inner component 121 comprises a second resilience. For example, the outer component 120 may be made of a different elastomeric composition with different spring rates than the inner component 121. Further, while FIGS. 3 and 4 illustrate each cartridge 101, 111 comprising two components 120, 121, it will be appreciated that the cartridges 101, 111 may comprise any number of components while remaining within the scope of the present disclosure. In some embodiments, the cartridges 101, 111 may comprise an equal number of components. In other embodiments, one of the two cartridges 101, 111 may comprise a first number of components while the other of the two cartridges 101, 111 comprises a second number of components.

In some embodiments, each of the components within a cartridge 101, 111 are of substantially equal size. In other embodiments, a cartridge 101, 111 may comprise a plurality of components of various sizes. In some embodiments, at least two components within a cartridge 101, 111 are of substantially equal size. In other embodiments, each component within a cartridge 101, 111 may be a different size than all of the other components within the cartridge 101, 111. In some embodiments, each of the components within a cartridge 101, 111 are of substantially equal resilience. In other embodiments, a cartridge may comprise a plurality of components of various resiliencies. In some embodiments, at least two components within a cartridge 101, 111 are of substantially equal resilience. In other embodiments, each component within a cartridge 101, 111 may be a different resilience than all of the other components within the cartridge 110, 111.

The drivelink 100 may comprise securing means to retain the cartridges 101, 111 within their respective sockets 105, 106. In some embodiments (e.g., the embodiment illustrated in FIGS. 3-6) the securing means comprises a pin 112, although other means for securing the cartridges 101, 111 within the housing 104 may be acceptable. In the embodiment of FIGS. 3-6, the housing 104 may comprise at least one aperture 109 proximate to each socket 105, 106, and the cartridges 101, 111 may each comprise at least one aperture 110 corresponding to a socket aperture (e.g., an aperture 110 through the first bearing cartridge 101 may correspond in alignment to an aperture 109 through the first socket 105, while an aperture 110 through the second bearing cartridge 111 may correspond in alignment to an aperture 109 through the second socket 106). The cartridges 101, 111 may be positioned such that the aperture 110 through each cartridge 101, 111 aligns with the aperture 109 through the housing 104 at each socket 105, 106. Thus, a pin 112 may be inserted through the aperture 109 in the housing 104 and through the corresponding aperture 110 in the cartridge 101, 111. In turn, the pins 112 may prevent movement of the cartridges 101, 111 within the sockets 105, 106. FIGS. 5 and 6 illustrate cross-sectional views of a drivelink 100 comprising a pin 112 extending through each housing aperture 109 and cartridge aperture 110.

Although FIGS. 5 and 6 disclose securing means comprising pins 112 and apertures 109, 110, it will be understood that other securing means may be used to secure the cartridges 101, 111 within the sockets 105, 106 while remaining within the scope of the present disclosure. For example, instead of the pins 112 and apertures 109, 110 or in addition to the pins 112 and apertures 109, 110, securing means may comprise an adhesive material (not shown) disposed between a surface of a cartridge 101, 111 and a peripheral surface 118, 119 of the housing 104 and/or between a surface of a cartridge 101, 111 and a surface of a trunnion race 107, 108. As another example, the securing means may comprise tabs (not shown) extending into a cartridge 101, 111 to prevent movement thereof.

The drivelink 100 may also be shaped to secure the cartridges 101, 111 within the housing 104. For example, as seen in FIGS. 5 and 6, the sockets 105, 106, races 103(*a*), 103(*b*), elastomeric members 102(*a*), 102(*b*), and trunnion races 107, 108 may each comprise an upper portion, a lower portion, and a middle, arcuate portion that is greater in overall width than the upper portion and lower portion. For example, the first inner periphery 118 of the housing 104 and to a convex portion 114 of the outer elastomeric member 102(*a*). The arcuate portions dimension the first bearing cartridge 101 such that the width of the middle portion of the elastomeric members 102(*a*) is greater than the upper portion and lower portion of the sockets 105. Thus, the arcuate portions may prevent the first bearing cartridge 101 from sliding out of the housing 104. Also, the outer elastomeric member 102(*a*) may also comprise a concave portion 116 that corresponds to a convex portion 115 of the first trunnion race 107, thereby further securing the first bearing cartridge 101 to the first trunnion race 107 and within the first socket 105. While FIGS. 5 and 6 show an embodiment wherein both cartridges 101, 111 comprise arcuate portions that are identical to one another, one skilled in the art will recognize that the first bearing cartridge 101 may comprise arcuate portions dissimilar to arcuate portions of the second bearing cartridge 111. Also, in some embodiments, the first bearing cartridge 101 comprises arcuate portions while the second bearing cartridge 111 does not comprise arcuate portions, or, in other embodiments, the second bearing cartridge 111 comprises arcuate portions while the first bearing cartridge 101 does not comprise arcuate portions. In yet other embodiments, neither the first bearing cartridge 101 nor the second bearing cartridge 111 comprises arcuate portions.

Figure 7:
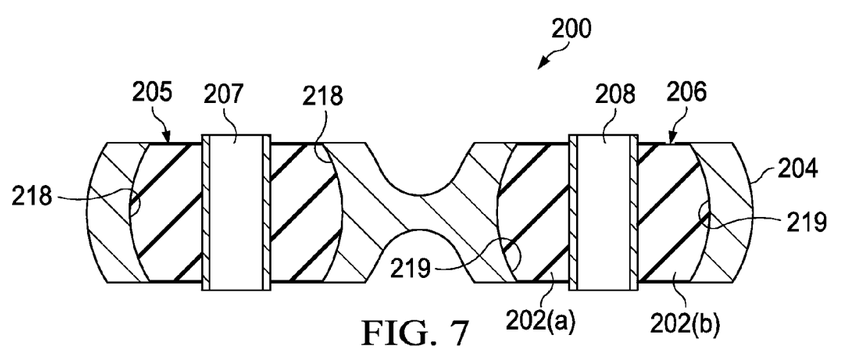
FIG. 7 is cross-sectional view of a different implementation of a drivelink.
Figure 8:
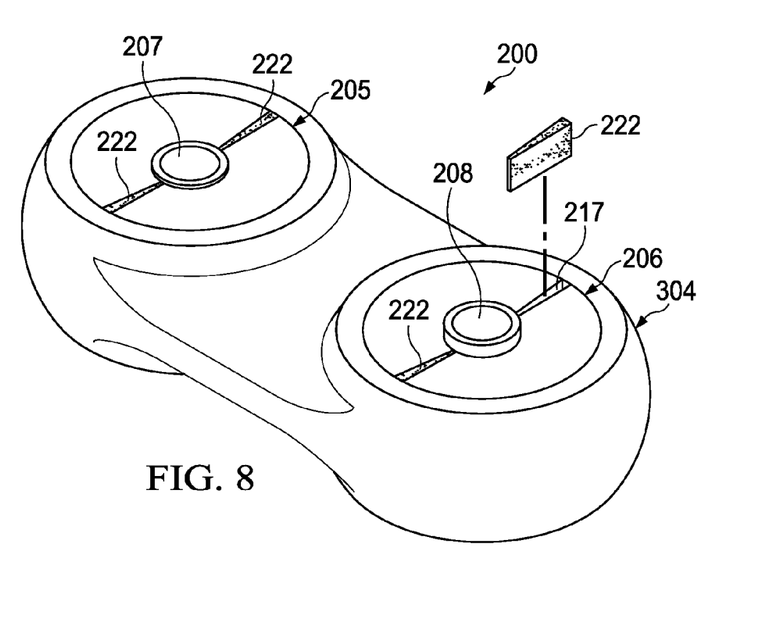
FIG. 8 is a perspective view of a drivelink according to another embodiment.

Now turning to FIGS. 7 and 8, shown is a drivelink 200 according to another embodiment. The drivelink 200 comprises a housing 204 comprising a first socket 205 formed within a first inner periphery 218 of the housing 204, and a second socket 206 formed within a second inner periphery 219 of the housing 204. In the embodiment shown in FIGS. 7 and 8, the drivelink 200 does not include a race, but rather a first pair of elastomeric members 202(*a*), 202(*b*) adhere directly to the outer periphery 218 and optionally the trunnion race 207, 208 while a second pair of elastomer members 202(*a*), 202(*b*) adhere directly to the inner periphery 219 and optionally the trunnion race 207, 208.

While the housing 204 and trunnion races 207, 208 may be made of any suitable material, in the embodiment illustrated in FIGS. 7 and 8, the housing 204 and trunnion races 207, 208 comprise a metallic material, such as titanium or steel. The elastomeric members 202(*a*), 202(*b*) may comprised vulcanized rubber that is cured while it is within the sockets 205, 206. Because the rubber vulcanizes as it cures within the housing, the crosslinking introduced by the vulcanization process creates a strong bond between the rubber and the housing 204. As a result, the cured rubber forms elastomeric members 202(a), 202(b) possessing high resilience and strength and that remain tightly secured to the housing 204.

The elastomeric members 202(a), 202(b) may comprise spacings 217. The spacings 217 may be sized so that, in operation, when the first pair of elastomeric members 202(a), 202(b) are compressed and thereby become deformed, the area of the deformed elastomeric members 202(a), 202(b) becomes substantially equal to the area of the first socket 205. Likewise, in operation, when the second pair of elastomeric members 202(a), 202(b) are compressed and thereby become deformed, the area of the deformed elastomeric members 202(a), 202(b) becomes substantially equal to the area of the second socket 206. As a result, the compressed cartridges offer improved kinematic properties without experiencing tension.

In some embodiments, the spacings 217 may be located along an axis perpendicular to loads exerted on the drivelink 200. Therefore, as the elastomeric members 202(a), 202(b) are compressed, they may deform into the spacings 217 and thereby take on a greater dimension that is substantially equal to the area within the sockets 205, 206. However, the spacings 217 need not be perpendicular to the exerted loads and may be located anywhere within the sockets 205, 206. Moreover, in other embodiments each pair of elastomeric members 202(a), 202(b) may comprise only one spacing 217 instead of two spacings 217. In other embodiments, one of the two cartridges 101, 111 comprises one spacing 117 while the other of the two cartridges 101, 111 comprises two spacings 117. In an embodiment comprising only one spacing 217, only one spacer 222 may be inserted into a socket 205, 206 before the curing process or, alternatively, the first and second spacers 222 may be inserted directly beside one another within the socket 205, 206.

Although the embodiment depicted in FIGS. 7 and 8 comprises elastomeric members 202(a), 202(b) of substantially equal size, in other embodiments the outer elastomeric member 202(a) may comprise a first size while the second elastomer member 202(b) comprises a second size.

In some embodiments, the outer elastomeric member 202(a) may comprise a first resilience while the inner elastomeric member 202(b) comprises a second resilience. For example, the outer elastomeric member 202(a) may be made of a different uncured rubber with different spring rights than the inner elastomeric member 202(b). Alternatively, the outer and inner elastomeric members 202(a), 202(b) may be made from the same type of uncured rubber but a curative added to the outer elastomeric member 202(a) may be different than a curative added to the inner elastomeric member 202(b) and/or a different amount of curative may be added to the outer elastomeric member 202(a) than to the inner elastomeric member 202(b). In some embodiments, the outer elastomeric member 202(a) and inner elastomeric member 202(b) are made of different types of uncured rubber and also a different type and/or amount of curative is added each elastomeric member 202(a), 202(b).

Further, while FIGS. 7 and 8 illustrate each socket 205, 206 comprising two elastomeric members 202(a), 202(b), it will be appreciated that the cartridges sockets 205, 206 may comprise any number of elastomeric members while remaining within the scope of the present disclosure. In some embodiments, the sockets 205, 206 may comprise an equal number of components. In other embodiments, one of the two sockets 205, 206 may comprise a first number of elastomeric members while the other of the two sockets 205, 206 comprises a second number of elastomeric members. In embodiments comprising more than two elastomeric members, more than two spacers 222 are inserted into the uncured rubber and the number of spacers 222, and the number of spacers 222 inserted into the uncured rubber is based on the desired number of elastomeric members.

In some embodiments, each of the elastomeric members within a socket 205, 206 are of substantially equal size. In other embodiments, a socket 205, 206 may comprise a plurality of elastomeric members of various sizes. In some embodiments, at least two elastomeric members within a socket 205, 206 are of substantially equal size. In other embodiments, each elastomeric member within a socket 205, 206 may be a different size than all of the other elastomeric members within the socket 205, 206. In some embodiments, each of the elastomeric members within a socket 205, 206 are of substantially equal resilience. In other embodiments, a socket 205, 206 may comprise a plurality of elastomeric members of various resiliencies. In some embodiments, at least two elastomeric members within a socket 205, 206 are of substantially equal resilience. In other embodiments, each elastomeric member within a socket 205, 206 may be a different resilience than all of the other elastomeric members within the socket 205, 206.

In the embodiment depicted in FIGS. 7 and 8, the drivelink 200 does not include securing means such as a pin or an adhesive layer. Since the elastomeric members 202(a), 202(b) are vulcanized directly to the housing 204, they are tightly bonded to the housing 204, thereby eliminating the need for separate securing means. While some embodiments may include separate securing means (e.g., pins and/or an adhesive layer), advantages may be gained through not including securing means. For example, the lack of separate securing means may reduce the amount of components, thereby reducing manufacturing costs. Furthermore, the lack of securing means offers improved operational performance since stress from such separate components will not be exerted on the drivelink 200.

In the embodiment depicted in FIGS. 7 and 8, the drivelink 200 may not include arcuate portions along the peripheral surfaces of the housing 204, elastomeric members 202(a), 202(b), and trunnion races 207, 208. Since the elastomeric members 202(a), 202(b) are vulcanized directly to the housing 204, they are tightly bonded to the housing 204, thereby eliminating the need for arcuate portions. While some embodiments may include arcuate portions along a surface of at least one of the elastomeric members 202(a), 202(b) and at least one of the housing 204 or trunnion races 207, 208, advantages can be gained through the lack of arcuate portions. For example, without the arcuate portions, the amount of stress exerted on the elastomeric members 202(a), 202(b) by the housing 204 is reduced.

Figure 9:
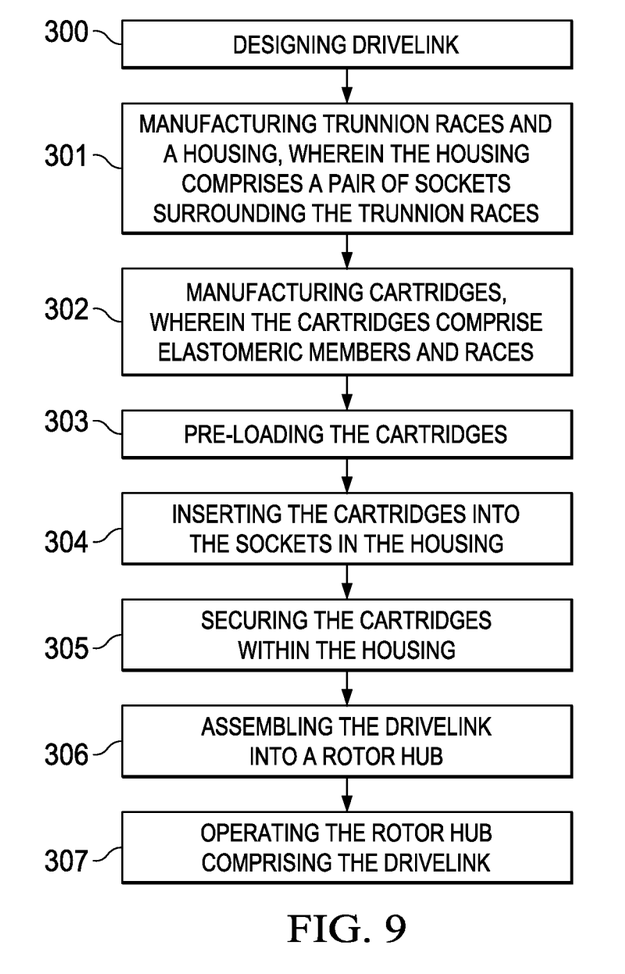
FIG. 9 is a flowchart illustrating a method of manufacturing a drivelink according to the embodiment illustrated in FIG. 3.
Figure 10:
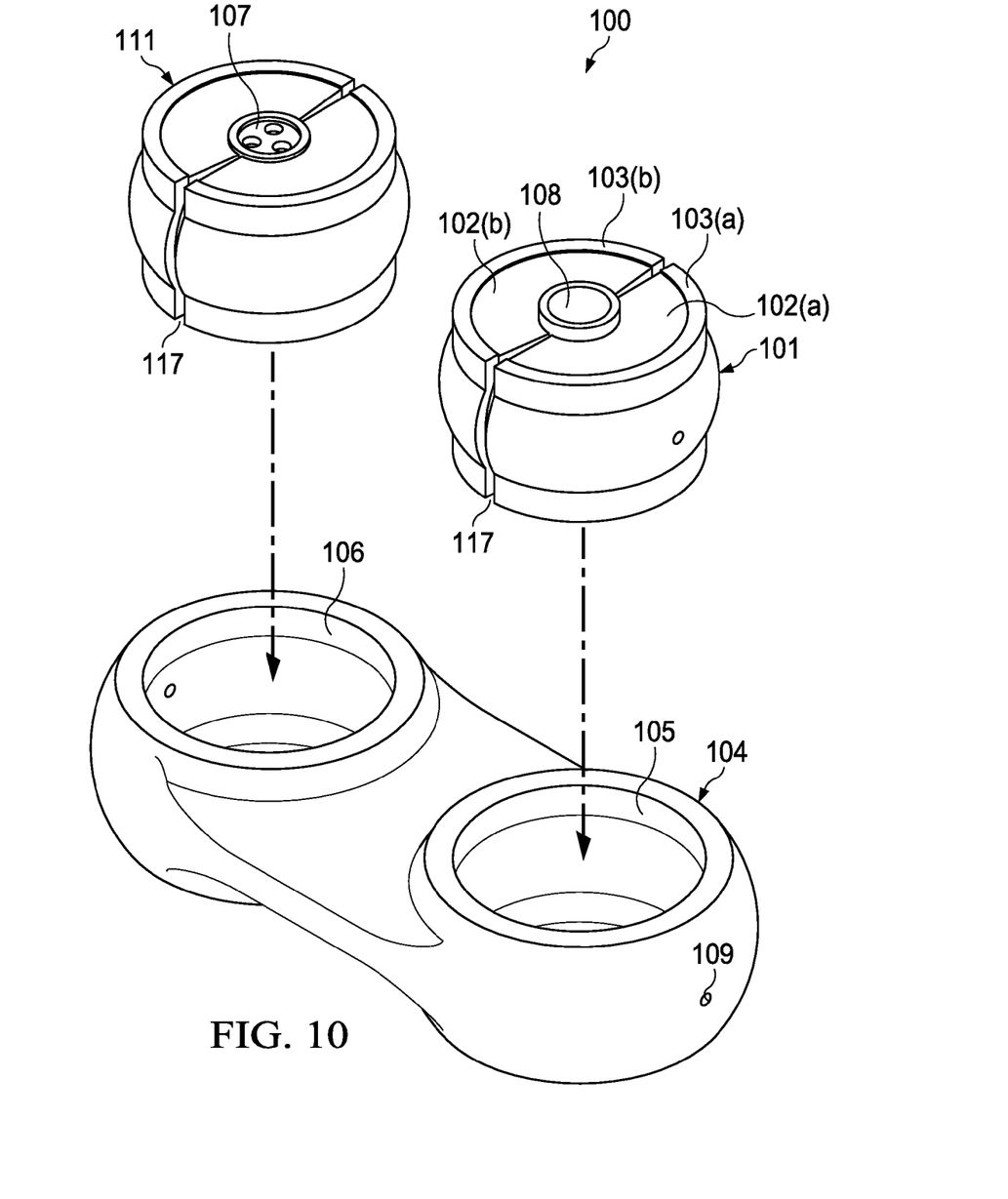
FIG. 10 is an illustration of the drivelink as shown in FIG. 3 before the cartridges are inserted into the housing.

Turning now to FIG. 9, depicted is a method of providing the housing 104 and bearing assembly described herein. Step 300 comprises designing a drivelink 100. During the designing step 300, a calculation may be carried out to determine the expected compression loads that will act on the drivelink during operation. Based on the expected compression loads and based on the type of material that will used for the elastomeric members 102(a), 102(b), a calculation may be carried out to determine the expected deformation that will be experienced by the elastomeric members during operation. In step 301, a housing 104 and trunnion races 107, 108 may be manufactured and the trunnion races 107, 108 may be disposed within the housing 104 to form sockets 105, 106. In step 302, the cartridges 101, 111 may be manufactured. The step 302 of manufacturing the cartridges 101, 111 may comprise manufacturing the elastomeric members 102(a), 102(b) and manufacturing the races 103(a), 103(b). During step 302 (e.g., before pre-compression takes place) the elastomeric members 102(a), 102(b) may be dimensioned to be substantially equal to the sockets 105, 106 within the housing 104. The elastomeric members 102(a), 102(b) may be formed and cured separately from one another. Once the elastomeric members 102(a), 102(b) have cured, in step 303 the elastomeric members 102(a), 102(b) may be pre-loaded. Pre-loading 303 the elastomeric members 102(a), 102(b) may comprise pre-compressing the elastomeric members a predetermined amount. The amount of pre-compression may correspond to the calculated expected deformation. For example, the amount that the elastomeric members 102(a), 102(b) are pre-compressed may be equal to the amount of expected deformation. The elastomeric members 102(a), 102(b) may be disposed within the races 103(a), 103(b) before or after the pre-compression. In step 304, the pre-loaded cartridges 101, 111 are inserted into the housing 104. FIG. 10 illustrates the insertion of the cartridges 101, 111 into the housing 104.

Since prior to the pre-loading, the size of each cartridge 101, 111 was substantially equal to the size of the corresponding socket 105, 106, when the cartridge 101, 111 is inserted into the corresponding socket after the pre-loading at least one spacing 117 is formed within the corresponding socket 105, 106. The cartridges 101, 111 may be inserted into the sockets 105, 106 such that the spacings 117 are located along an axis perpendicular to the direction of the expected loads.

In step 305, the cartridges 101, 111 are secured within the housing 104 via securing means. In step 306, the drivelink 100 is assembled into a rotor hub. Step 307 comprises operation of the rotor hub and drivelink 100. In operation, the disclosed drivelink 100 provides superior kinematic performance while experiencing substantially no tension. Since the size of the sockets 105, 106 are substantially equal to the size of the cartridges 101, 111 prior to the pre-compression, and since the amount the cartridges 101, 111 are pre-compressed is substantially equal to the amount the cartridges 101, 111 are expected to deform upon compression, the cartridges 101, 111 are configured to react to the compression by deforming into a shape substantially equal to shape of the sockets 105, 106. Thus, when compressed, the size of the first bearing cartridge 101 is substantially equal to the first socket 105 and the spacings 117 within the first socket 105 are eliminated. Likewise, when compressed, the size of the second bearing cartridge 111 is substantially equal to the second socket 106 and the spacings within the second socket 106 are eliminated. As a result, the compressed cartridges offer improved kinematic properties without experiencing tension.

Figure 11:
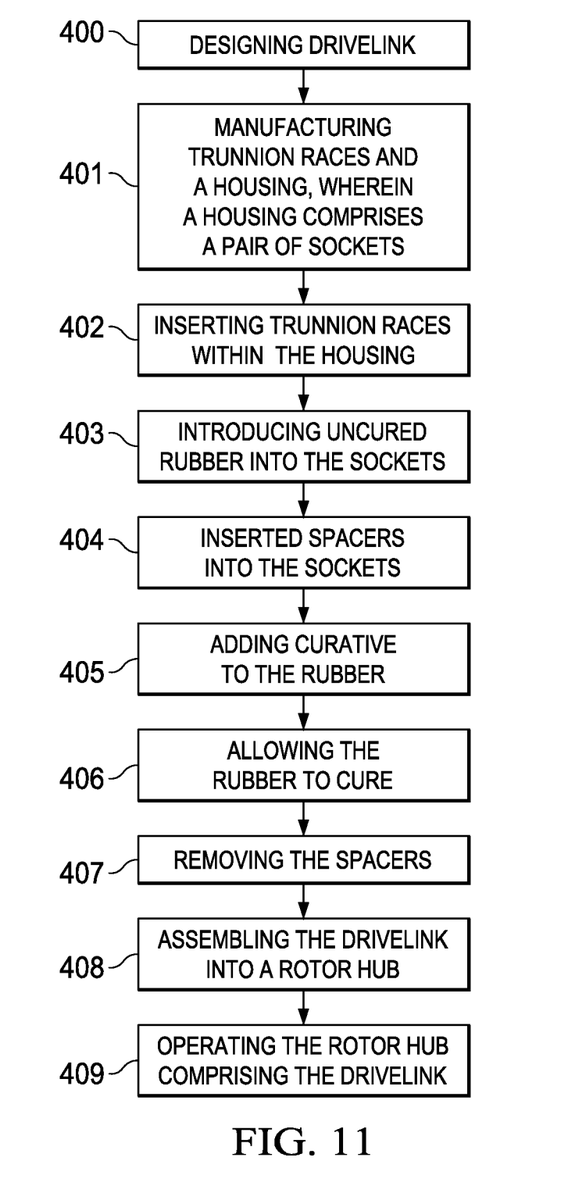
FIG. 11 is a flowchart illustrating a method of manufacturing a drivelink according to the embodiment illustrated in FIG. 7.

FIG. 11 illustrates another method of providing the drivelink 200 according to the embodiment illustrated in FIGS. 7 and 8. Step 400 comprises designing a drivelink 200. During the designing step 400, a calculation may be carried out to determine the expected compression loads that will act on the drivelink 200 during operation. Based on the expected compression loads and based on the type of material that will be used for the first and second pairs of elastomer members 202(a), 202(b), a calculation may be carried out to determine the expected deformation that will be experienced by the elastomeric members 202(a), 202(b) during operation. Step 401 comprises manufacturing trunnion races 207, 208 and housing 204, wherein the housing comprises a pair of sockets 205, 206. Step 402 comprises inserting the first trunnion race 207 within the housing and inserting the second trunnion race 208 within the housing 204. In step 403, uncured rubber or other elastomeric material is introduced into the first socket 205 and into the second socket 206. In step 404, a first pair of spacers 222 is inserted into the first socket 205 and a second pair of spacers 222 is inserted into the second socket 206. The size of the spacers 222 may be engineered to create appropriately sized spacings 217 between the elastomeric members 202(a), 202(b). In step 405, a curative is added in order to vulcanize the rubber. In step 406, the rubber is allowed to cure. After the rubber has cured, in step 407, the spacers 222 are removed from the sockets 205, 206. Upon removal of the spacers, the cured rubber forms a pair of elastomeric members 202(a), 202(b) separated by a pair of spacings 217 previously occupied by the spacers 222. In step 408, the drivelink 200 is assembled into a rotor hub. Step 409 comprises operating the rotor hub with the drivelink 200.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+K*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An apparatus comprising:
a drivelink comprising:
a housing including a socket with a circular cross-sectional area having a first central axis, and
a bearing cartridge having an outer elastomeric member and an inner elastomeric member separated from one another by a spacing when disposed within the socket, the outer elastomeric member, the inner elastomeric member, and the spacing having a circular cross-section area having a second central axis that substantially aligns with the first central axis, wherein the outer elastomeric member and the inner elastomeric member are configured to fill a portion of the spacing when the outer elastomeric member undergoes operation compression, wherein a cross-sectional area of the cartridge is coplanar with the circular cross-sectional area of the socket, and wherein the cross-sectional area of the cartridge is less than the circular cross-sectional area of the socket.

2. The apparatus of claim 1, wherein the cartridge comprises an outer elastomeric member and an inner elastomeric member separated from one another by the spacing.

3. The apparatus of claim 2, wherein the outer elastomeric member comprises a first resiliency and the inner elastomeric member comprises a second resiliency.

4. The apparatus of claim 1, wherein the socket comprises a first socket and the cartridge comprises a first bearing cartridge, and wherein the housing further comprises a second socket disposed proximate the first socket along a lateral axis, and wherein the spacing extends across the first bearing cartridge along a longitudinal axis substantially perpendicular to the lateral axis.

5. The apparatus of claim 1, further comprising:
    an aperture extending through a portion of the housing and through a portion of the cartridge, and
    a pin insertable within the aperture.

6. The apparatus of claim 1, wherein the socket comprises a first socket and the cartridge comprises a first bearing cartridge, and wherein the housing is dog-bone shaped and further comprises a second socket disposed proximate the first socket along an axis.

7. The apparatus of claim 1, wherein the cartridge comprises an upper portion, a lower portion, and a middle portion disposed between the upper portion and the lower portion, wherein the width of the middle portion is greater than the width of the upper portion, and wherein the width of the middle portion is greater than the width of the lower portion.

8. The apparatus of claim 1, further comprising a fuselage and an engine, wherein the drivelink is incorporated into a hub assembly on an aircraft.

9. An apparatus comprising:
    a drivelink comprising:
        a housing having a socket, and
        a bearing cartridge positioned within the socket and comprising a first portion and a second portion separated from one another by a spacing, wherein the first portion and the second portion are configured to fill a portion of the spacing when the first portion undergoes compression when a load is applied to the drivelink, wherein the first portion is configured to undergo compression when the load is applied to the drivelink, and wherein the second portion is configured to not be in tension when the load is applied to the drivelink.

10. The apparatus of claim 9, wherein the cartridge comprises an outer elastomeric member and an inner elastomeric member separated from one another by the spacing.

11. The apparatus of claim 9, wherein the socket comprises a first socket and the cartridge comprises a first bearing cartridge, and wherein the housing further comprises a second socket disposed proximate the first socket along a lateral axis, and wherein the spacing extends across the first bearing cartridge along a longitudinal axis substantially perpendicular to the lateral axis.

12. The apparatus of claim 9, wherein the cartridge comprises a plurality of elastomeric members and a race surrounding at least a portion of the elastomeric members.

13. The apparatus of claim 9, wherein the socket comprises a first socket and the cartridge comprises a first bearing cartridge, and wherein the housing is dog-bone shaped and further comprises a second socket disposed proximate the first socket along an axis.

14. The apparatus of claim 9, wherein the cartridge comprises an upper portion, a lower portion, and a middle portion disposed between the upper portion and the lower portion, wherein the width of the middle portion is greater than the width of the upper portion, and wherein the width of the middle portion is greater than the width of the lower portion.

15. The apparatus of claim 9, further comprising a fuselage and an engine, wherein the drivelink is incorporated into a hub assembly on an aircraft.

16. A method comprising:
    providing a drivelink comprising:
        a housing having a socket, and
        a bearing cartridge positioned within the socket and comprising a first portion and a second portion separated from one another by a spacing, wherein the first portion and the second portion are configured to fill a portion of the spacing when the first portion undergoes compression when a load is applied to the drivelink, wherein the first portion is configured to undergo compression when the load is applied to the drivelink, and wherein the second portion is configured to not be in tension when the load is applied to the drivelink.

17. The method of claim 16, wherein providing the drivelink comprises designing the drivelink.

18. The method of claim 16, wherein providing the drivelink comprises assembling the drivelink.

* * * * *